(12) United States Patent  
Nishiyama et al.

(10) Patent No.: US 6,369,480 B1  
(45) Date of Patent: Apr. 9, 2002

(54) COMPRESSOR USING A MOTOR

(75) Inventors: Noriyoshi Nishiyama, Izumiotsu; Tomokazu Nakamura, Katano; Yasufumi Ikkai, Kobe; Yukio Honda, Katano; Hiroshi Murakami, Suita; Shinichiro Kawano, Katano, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/543,796

(22) Filed: Apr. 6, 2000

Related U.S. Application Data (63) Continuation-in-part of application No. 08/945,460, filed as application No. PCT/JP97/00489 on Feb. 21, 1997, now Pat. No. 6,049,153.

(30) Foreign Application Priority Data

Feb. 23, 1996 (JP) .............................. 8-35988

(51) Int. Cl.$^7$ .......................... H02K 21/14; H02K 1/12
(52) U.S. Cl. ................. 310/156.53; 310/156.38; 310/261; 310/254; 417/410.1
(58) Field of Search ................. 310/156, 261, 310/254; 417/410.1

(56) References Cited

U.S. PATENT DOCUMENTS

| | | |
|---|---|---|
| 3,353,046 A | 11/1967 | Papst |
| 4,642,886 A | 2/1987 | Muck et al. |
| 4,818,911 A | 4/1989 | Taguchi et al. |
| 4,998,032 A | 3/1991 | Burgbacher |
| 5,097,166 A | 3/1992 | Mikulic |
| 5,583,387 A | 12/1996 | Tankeuchi et al. |
| 5,643,119 A | 7/1997 | Yamaguchi et al. ............ 475/5 |
| 5,666,015 A * | 9/1997 | Uchibori et al. ............ 310/261 |
| 5,691,584 A | 11/1997 | Toida et al. ............... 310/67 R |
| 5,729,072 A | 3/1998 | Hirano et al. |
| 5,811,904 A * | 9/1998 | Tajima et al. ................ 310/156 |
| 5,861,693 A | 1/1999 | Takahashi et al. |
| 5,864,192 A | 1/1999 | Nagate et al. ............... 310/156 |
| 5,962,999 A * | 10/1999 | Nakamura et al. ........... 318/432 |
| 6,133,662 A | 10/2000 | Matsunobu et al. ......... 310/156 |

FOREIGN PATENT DOCUMENTS

| | | |
|---|---|---|
| JP | 62-160048 | 7/1987 |
| JP | 63-242157 | 10/1988 |
| JP | 5-284677 | 10/1993 |
| JP | 5-292714 | 11/1993 |
| JP | 6-98514 | 4/1994 |
| JP | 6-66277 | 9/1994 |
| JP | 7-20050 | 4/1995 |
| JP | 7-236240 | 9/1995 |
| JP | 7-255138 | 10/1995 |
| JP | 7-303357 | 11/1995 |
| JP | 8-19196 | 1/1996 |

OTHER PUBLICATIONS

Japanese language search report for Int'l Appln. No. PCT/JP97/00489.

English translation of Japanese language search report for Int'l Appln. No. PCT/JP97/00489.

* cited by examiner

*Primary Examiner*—Burton S. Mullins
(74) *Attorney, Agent, or Firm*—Ratner & Prestia, PC (57) ABSTRACT

The invention relates to a motor comprising a stator core having plural teeth and slots provided among the teeth, a winding applied on the teeth by a single turn, and a rotor incorporating plural permanent magnets, which is rotated and driven by utilizing reluctance torque in addition to magnet torque. By turning thus divided teeth by a single winding, the occupation rate of the winding in the slots can be raised. As a result, a motor of small size and large output can be presented.

15 Claims, 9 Drawing Sheets

COMPRESSOR USING A MOTOR

CROSS-RELATED APPLICATIONS

This application is a continuation-in-part application of application Ser. No. 08/945,460, filed on Feb. 2, 1998, now U.S. Pat. No. 6,049,153 which is a U.S. National Phase Application of PCT International Application No. PCT/JP97/00489 filed Feb. 21, 1997

TECHNICAL FIELD

The present invention relates to a synchronous motor comprising a stator for generating a rotary magnetic field, for rotating and driving by making use of a reluctance torque.

BACKGROUND ART

In a conventional general synchronous motor, a stator is formed by integrally projecting plural teeth from a ring-shaped yoke to its inner circumferential side. This stator is fabricated by laminating stator plates having plural teeth projecting to the inner circumferential side. It also comprises a stator core forming slots among these teeth, and windings are wound in these slots by distributed winding. The distributed winding is a winding method for winding distant teeth through slots. The rotor is composed by burying plural permanent magnets for magnetic poles in the outer circumference of the rotor core, and mounting a rotary shaft in the center. magnets for magnetic poles in the outer circumference of the rotor core, and mounting a rotary shaft in the center.

In this way, by burying permanent magnets inside the rotor, the buried permanent magnet motor can utilize not only the magnet torque but also the reluctance torque, in which the reluctance torque is generated in addition to the magnet torque by the permanent magnets, as an inductance difference occurs between the inductance Ld in the direction of the d-axis which is a direction for coupling the center of the permanent magnet and the rotor center, and the inductance Lq in the direction of the q-axis which is a direction rotated 90 degrees of electrical angle from the d-axis. This relation is shown in formula (1).

$$T = Pn\{\psi a \times Iq + \frac{1}{2}(Ld - Lq) \times Id \times Iq\} \quad (1)$$

where

Pn: number of pole pairs

ψ a: interlinkage magnetic flux

Ld: d-axis inductance

Lq: q-axis inductance

Iq: q-axis current

Id: d-axis current

Formula (1) shows a voltage equation of dp conversion. For example, in a surface magnet motor, since the permeability of the permanent magnet is nearly equal to that of air, both inductance Ld and Lq in formula (1) are nearly equal values, and the reluctance torque portion expressed in the second term enclosed in braces in formula (1) does not occur. enough to increase the difference of (Ld−Lq). The inductance L, which expresses the degree of ease of passing of magnetic flux, is proportional to N,Q (number of turns of teeth), and hence by increasing the number of turns on the teeth, the difference of (Ld−Lq) becomes larger, so that the reluctance torque can be increased. However, if the number of turns is increased in order to utilize the reluctance torque more, as the number of turns increases, the winding group projecting to the stator end surface, that is, the coil end becomes larger. Hence, to rotate and drive the motor efficiently, if attempted to make use of the reluctance torque, the coil end becomes larger, and the motor itself is increased in size.

In the distributed winding, moreover, by turning windings plural times, a winding ring is formed, and this winding ring is inserted into the teeth, and the periphery of the winding ring becomes longer than the periphery of teeth. Still more, in the distributed winding, since the teeth are wound through slots, the windings cross each other. Thus, in the distributed winding, the winding projects from the stator end, and the windings cross each other to increase the size of the coil end.

Hence, if attempted to drive the motor efficiently by making use of the reluctance torque, the motor size becomes larger. To the contrary, if the motor is reduced in size, the output of the motor drops.

In the air-conditioner, refrigerator, electric vehicle, etc., however, a motor of large output and small size is required.

Incidentally, the magnetic pole portion at the end of the teeth in the stator is formed wider in the peripheral direction.

Between the adjacent magnetic pole portions, however, since openings are formed for laying down windings in the slots, the interval of ends of teeth must be formed wider in the peripheral direction. That is, because of the distributed winding, an opening for inserting the winding ring in the teeth is needed.

Incidentally, the gap between the stator inner circumference and the rotor outer circumference is generally set uniform on the whole periphery except for the openings of the slots.

In such conventional constitution, at the stator side, since there is an opening for a slot between magnetic pole portions, an insulating portion in the peripheral direction is formed in the distribution of the magnetic flux leaving the magnetic pole portions, which produced a problem of occurrence of cogging torque during rotor rotation. At the rotor side, when the distribution of the magnetic flux leaving its outer circumference is brought closer to sine waveform, the cogging torque can be decreased, but since the gap between the stator inner circumference and rotor outer circumference is uniform, the magnetic resistance in this gap is constant on the whole periphery, and in the joining portions of the ends of the permanent magnets, the magnetic flux distribution changes suddenly, and the cogging torque increases. Thus, the cogging torque increasing factors are combined at the stator side and rotor side, and a large cogging torque is caused.

SUMMARY OF THE INVENTION

The motor of the invention comprises a stator core having plural teeth and slots provided among these teeth, a winding making a single turn around the teeth, and a rotor incorporating plural permanent magnets, being constituted to rotate and drive by making use of reluctance torque, in which the winding does not cross because of a single turn, and the coil end can be decreased in size.

Moreover, in the core composed by combining plural independent core elements in an annular form, since the winding is turned in the portion of a slot recess formed at both sides of the teeth of the core element, and the winding is wound about the core element, the winding can be applied on the stator in compact arrangement. Moreover, since the winding is not turned in the adjacent state of teeth, it is not necessary to keep a wide opening between the ends of teeth, so that the interval of ends of teeth can be narrowed.

Further, in the stator core composed by coupling ends of plural core elements, and folding the core element group with bent ends into an annular form, since the winding is turned in the slot shape recess portion formed at both sides of the teeth of the core elements, when winding around the teeth, the end interval of teeth can be widened, and the winding can be applied around the teeth in compact arrangement. Moreover, since the ends are coupled, position setting when assembling is easy.

Further, the clearance between the confronting surface of teeth of the permanent magnet and the outer circumference of the rotor core is wider in the central part than in the end portion of the permanent magnet, and the reluctance torque can be utilized effectively.

Further, since the shape of the permanent magnet is projecting toward the center of the rotor in its middle, the reluctance torque can be utilized effectively.

Further, since the width between the adjacent permanent magnets is 0.15 to 0.20 of the width of teeth confronting two magnetic poles (two permanent magnets), the torque ripple of the motor can be suppressed.

Further, the leading end of the magnetic pole portion of the inner circumferential side of the teeth is projecting in the peripheral direction across a slight gap between the ends of the teeth, and the gap between the teeth and rotor outer circumference is nearly constant, so that useless magnetic flux does not flow at the ends of the teeth.

Further, as the leading end of the magnetic pole portion of the inner circumferential side of the teeth is projecting in the peripheral direction so as to connect between ends of the teeth, the gap between the teeth and rotor outer circumference may be continuous.

Further, by setting the width b of the opposite sides of the ends of teeth at b<0.6 mm, the magnetic flux is saturated at the ends of the teeth.

Further, the incorporated permanent magnets are thinner in the permanent magnet positioned ahead in the rotor rotating direction than therefor the permanent magnet rear portion, so that the quantity of the permanent magnets may be decreased without lowering the torque.

Further, the profile of the adjacent portions of the permanent magnets is a recess form corresponding to the disk-shape profile positioned outside of the center of the permanent magnet, and the magnetic resistance is increased in the adjacent portions of the permanent magnets, so that the magnetic flux distribution may be close to a sine waveform.

Further, the length of the rotor outer recess positioned outside of the adjacent portions of the permanent magnets should be properly corresponding to the angle of 0.2 to 0.4 of the central angle of the one pole portion of the rotor core.

Further, the gap between the rotor outer recess and teeth should be properly two or more times of the gap between the rotor outer circumference and the teeth.

Further, when the incorporated permanent magnets have two layers, the q-axis inductance increases, and the reluctance torque portion is maximized.

Further, the interval is properly a value set larger than ⅓ of the width of the teeth.

Further, when the winding is a flat square wire, the occupation rate can be enhanced more than in the case of round wire. In particular, the winding of flat square wire is suited to concentric concentrated winding around the teeth.

DETAILED DESCRIPTION OF THE INVENTION

Referring now to FIG. 1 through FIG. 4, embodiment 1 of the invention is described below.

Figure 1:
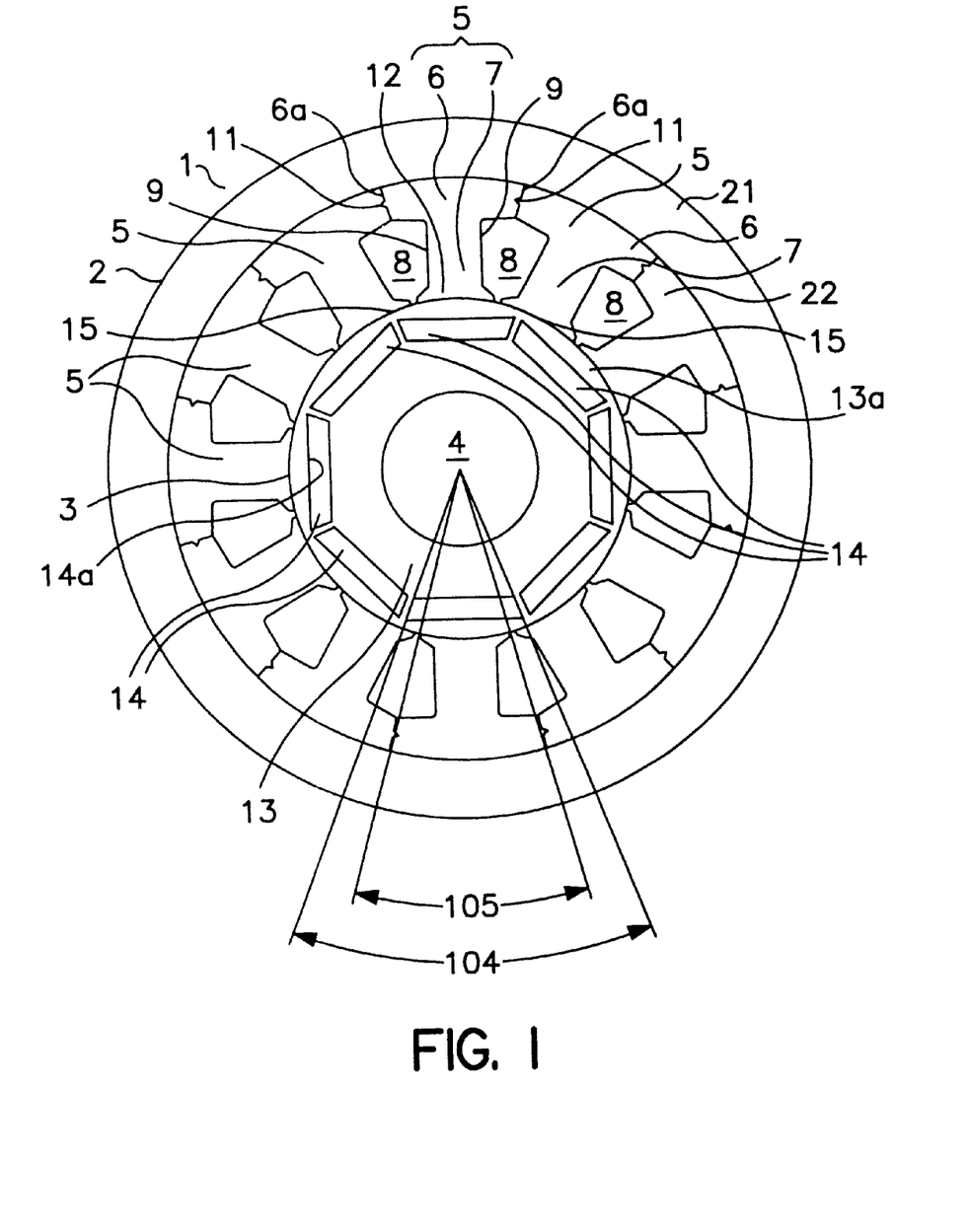
FIG. 1 is a sectional view of a motor in exemplary embodiment 1 of the invention.

In FIG. 1, is a synchronous motor 1 rotates by utilizing reluctance torque, as well as magnet torque, and it is composed of a stator 2, a rotor 3, and a rotary shaft 4.

The stator 2 is composed of a ring-shaped frame 21, a stator core 22 combining plural independent core elements 5 made of high permeability material in an annular form, and a winding wound around slots 8 formed between teeth 7 of each core element 5, and when a current is applied to these winding groups, a rotary magnetic field is generated.

The stator core 22 is composed by combining the plural core elements 5 in an annular form on the outer circumference 6 thereof, and fitting and fixing in the inner circumference of the frame 21, and each outer circumference 6 is formed in an entire shape of a sector form in which the extension line of both side surfaces 6a passes through the stator center. In the core elements 5, as specifically shown in FIG. 2, slot forming recesses 9 are formed in the inner circumferential portion, and slots 8 are formed in the slot forming recesses 9 in the adjacent teeth 7. At both side surfaces 6a, stopping portions 11 composed of engaging bumps 10a and engaging recesses 10b for engaging with each other when the core elements 5 are combined in an annular form are provided, so that the core elements 5 may be mutually fixed firmly. The core elements 5 are combined by welding, or they may be also fixed by crimping by forming fitting parts at the side of the core elements 5.

Figure 4:
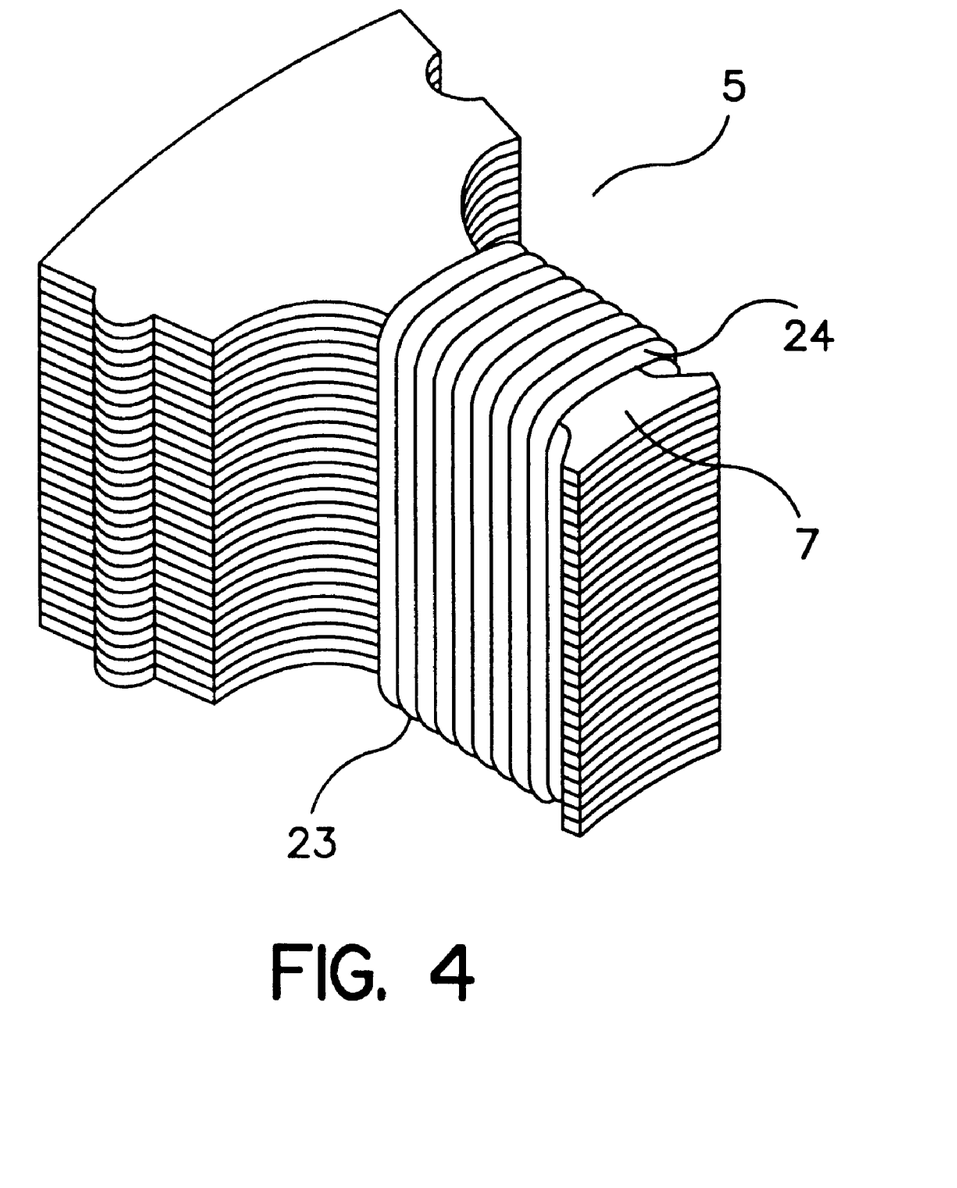
FIG. 4 is a diagram showing a core element of exemplary embodiment 1.

In this way, the stator 2 is formed by combining plural core elements 5. Hence, instead of turning the winding around the stator 2, the stator 2 can be formed after turning the winding around the core element 5. Thus, since the winding is wound about every core element 5, a single winding (concentrated winding) may be formed easily. That is, as shown in FIG. 4, when turning the winding, as shown in FIG. 4, there is no disturbing position for winding at the side surface of the teeth 7. As a result, the winding port of the turning device rotates about the teeth 7, so that an arrangement winding may be formed through an insulating film 24. Moreover, the turning precision of the winding 40 may be enhanced and the arrangement winding may be formed easily.

Thus, by forming the winding of the stator 2 as a single winding, mutual crossing of winding at the stator end can be suppressed. As a result, since the winding is not crossed at the end of the rotary shaft direction of the stator 5, the size of the coil end can be suppressed. Moreover, by winding in the divided state of the stator, the periphery of the teeth 5 and one turn of the winding can be equalized in length. As a result, the winding does not project at the stator end, and the coil end may be reduced in size.

Further, because of winding in the divided state of the stator 5, it is not necessary to consider the space of the winding port of the winding device when winding, and the winding can be overlaid as much as possible. Besides, since the stator 5 is divided when winding, the precision of the winding device is heightened, and an arrangement winding may be formed. As a result, the occupation rate in the slot is heightened. Since the reluctance torque is proportional to the number of turns, the reluctance torque can be enhanced by raising the occupation rate.

In this way, since the winding around the teeth can be turned in a proper length, there is no extra winding, and the winding length can be shortened for the total number of turns. As a result, the copper loss is decreased, and the heat generation of the winding can be decreased.

Furthermore, since the interval d of the ends of the teeth does not require the space for passing the winding through the winding port of the device, the interval d of the ends of the teeth can be reduced. As a result, gap changes between the teeth and rotor outer circumference are smaller, and the cogging torque decreases.

Hitherto, in the case of single winding (i.e. a concentrated winding) on the stator 2 by a turning device, it was possible to wind at an occupation rate of about 30%. However, after winding on the core element 5, when assembled, the wire filling rate in the slot 8 can be set more than 30%, or the wire filling rate may be set even more than 60%.

Figure 2:
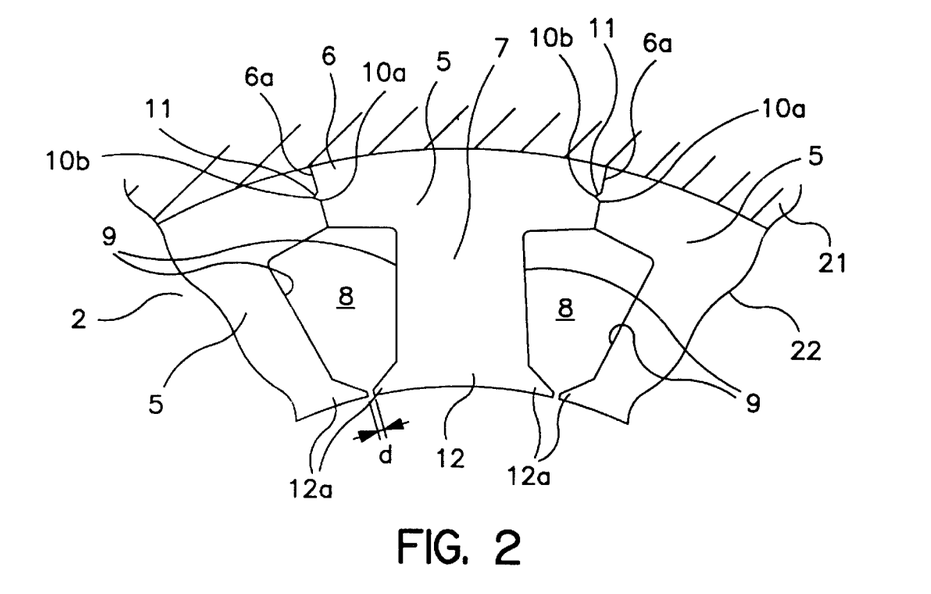
FIG. 2 is a partial sectional view of a stator in exemplary embodiment 1.

The magnetic pole portions 12 of the inner end side from the slot forming recesses 9 of the core elements 5 are projected long to both sides in the peripheral direction, and across a slight gap d between the ends, the magnetic pole portions 12 of adjacent core elements 5 are connected, so that there may be no interruption in the distribution of magnetic flux in the peripheral direction from the magnetic pole portion 12 of each core element 5. Besides, both sides 12a of the magnetic pole portion 12 are formed nearly in a triangular shape so that the width in the radial direction may be smaller toward the end, thereby decreasing the magnetic leak between the magnetic pole portions 12 of the adjacent core elements 5 by increasing the magnetic resistance at both sides of the magnetic pole portion 12.

The slight gap d in embodiment 1 is $0<d<0.2$ mm. The slight gap d is formed by assembling after winding on the core element 5, and by opening such small gap, the magnetic leak from the winding of the slot 8 can be suppressed, and the cogging torque becomes smaller. The gap d of $0<d<0.2$ mm is a value obtained by experiments, and the cogging torque is decreased efficiently at this value. By not contacting the ends completely, it is effective to suppress flow of useless magnetic flux between the adjacent teeth 7.

This gap d may be set to 0 if the magnetic flux leak between adjacent core elements 5 can be ignored and there is no problem in assembling precision, so that the cogging torque can be eliminated.

On the confronting surfaces of the ends of the teeth 7 (the end of teeth 7, being the side confronting between the ends of the teeth 7), b is properly at $b<0.6$ mm. By defining b in a range of $b<0.6$ mm, magnetic saturation occurs at the end of the teeth 7, and useless magnetic flux leak can be decreased.

On the other hand, the rotor 3 comprises a rotor core 13 made of high permeability material so that the magnetic flux of the rotary magnetic field produced by the winding group of the stator 2 may pass easily, and permanent magnets 14 incorporated in the rotor core 13 at equal intervals in the peripheral direction corresponding to the poles on the rotor 3. These permanent magnets 14 are disposed so that the S pole and N pole may be alternate in the peripheral direction.

The teeth confronting surface 14a of the permanent magnet 14 is linear. The distance between the teeth confronting surface 14a and the outer circumference of the rotor 13 is wider in the middle part than at the end part of the permanent magnet 14. Thus, in the outer circumference of the rotor 13, having a portion of relatively low reluctance and a portion of relatively high reluctance, it is possible to produce an inductance difference between the q-axis inductance and d-axis inductance, so that it is possible to rotate and drive by making use of reluctance torque. Incidentally, the shape of the permanent magnet 14 may be a shape projecting in the middle portion toward the center of the rotor 13.

Figure 3:
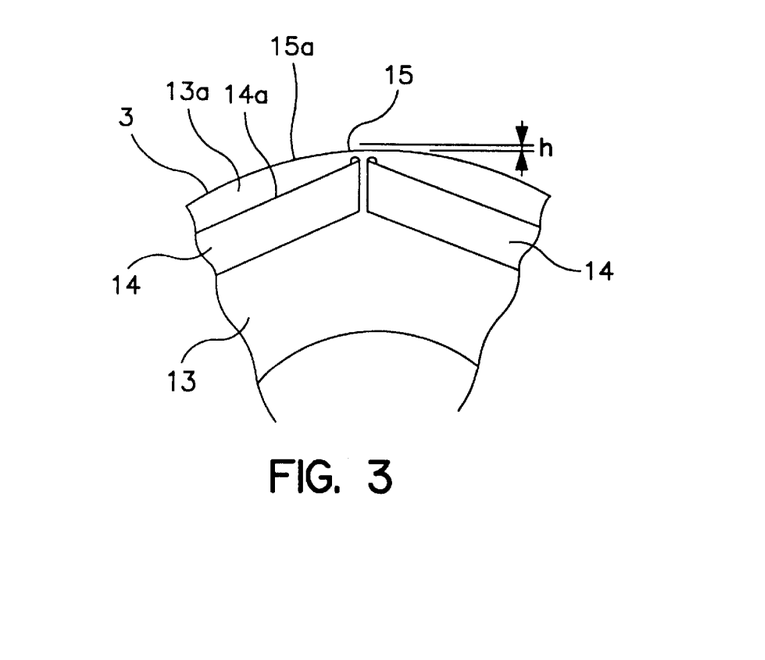
FIG. 3 is a partial sectional view of a rotor in exemplary embodiment 1.

On the outer circumference of the rotor core 13, as shown specifically in FIG. 3, a linear cut-off portion 15 is formed at the adjacent end portions of the permanent magnets 14.

The outer circumference of the stator 2 is covered with a ring-shaped frame 21, and reinforces the core elements 5 integrated by welding. By using the frame 21 in this manner, even in the motor rotating at high speed, the core elements are fixed firmly. If the stator main body assembled from the core elements 5 has a sufficient strength, it is not necessary to reinforce by the frame 21.

In this constitution, the motor of the invention can be driven by utilizing the reluctance torque as well as the magnet torque. In spite of the occupation rate of over 60% of the slots 8 in the motor, the size of the stator is small.

Since the output torque of the motor rotated and driven by making use of reluctance torque in addition to magnet torque is in the relation as shown in formula (1), when the occupation rate of the slots 8 is raised, the difference of Ld–Lq becomes larger, and the output torque can be heightened. That is, since the inductance L is proportional to N,Q (number of turns), the greater the number of turns, that is, the higher the occupation rate in the slots 8, the higher the output becomes.

In the motor driven by utilizing the reluctance torque in addition to the magnet torque, when the stator 2 is assembled after turning a winding about the core elements 5, the occupation rate can be enhanced, so that high output and small size may be realized.

Incidentally, it was found by experiments that the torque ripple is decreased when the width of the adjacent permanent magnets is 0.15 to 0.20 of the width of the teeth confronting two magnetic poles (two permanent magnets) (in 8 poles and 12 slots in FIG. 1, three teeth correspond to two magnetic poles, and in the case of 8 poles and 24 slots, six teeth are equivalent).

In the rotor 3, in the adjacent end portions of the permanent magnets 14 on the outer circumference of the rotor core 13, a cut-off portion 15 nearly linear to the rotor outer recess is formed. By forming such cut-off portion 15, the gap between the stator 2 inner circumference and rotor 3 outer circumference becomes large in the adjacent end portions of the permanent magnets 14. Therefore, since the magnetic resistance is large in the gap, the magnetic flux distribution in the gap between the stator 2 inner circumference and rotor 3 outer circumference is closer to the sine waveform.

Meanwhile, the length of the rotor outer recess positioned outside of the portion between the adjacent permanent magnets is properly a length corresponding to an angle of 0.2 to 0.4 of the central angle of one pole of the rotor core.

The spatial gap h between the teeth 7 and cut-off portion 15 is required to be more than 2 times of the spatial gap between the teeth 7 and rotor outer circumference. In embodiment 1, it has been known by experiment that the spatial gap of the teeth 7 and the cut-off portion should be 0.7 to 1 mm.

As shown in FIG. 1, the rotor magnet pitch 104 is greater than the stator coil pitch 105.

Thus, in this embodiment 1, since the cogging torque generating factors at both stator 2 side and rotor 3 side can be suppressed, a synchronous motor of a small cogging torque can be presented.

By employing such motor in the compressor, refrigerator, air-conditioner, electric vehicle, etc., it is effective to reduce the size and widen the accommodation space.

The motor used in an electric vehicle is required to be small in size in order to keep a wide space in the compartment, and at the same time a motor capable of utilizing the current of the charger efficiently is needed. In the motor used in the electric vehicle, mostly, a flat square wire with sectional width of 4 mm or more and height of 1.5 mm is used. The large current flowing in the winding is 300 amperes or more. Rotating at 7000 to 15000 by passing a large current, it is effective to use a motor of short winding length and a small heat generation for the number of turns, as the motor of the invention. If arrangement winding is possible, the occupation rate may be enhanced more than in round wires.

It is very effective to use such motor of the invention in a motor passing a large current as in an electric vehicle. The description herein relates to a motor using a single winding stator, utilizing reluctance torque in addition to magnet torque, by burying permanent magnets, but excellent effects are also obtained by incorporating gaps with low permeability materials or resin materials in the rotor, instead of the permanent magnets, and rotating and driving by utilizing the reluctance torque only. That is, excellent effects are obtained if a stator of single winding is used in a synchronous motor.

(Embodiment 2)

Figure 5:
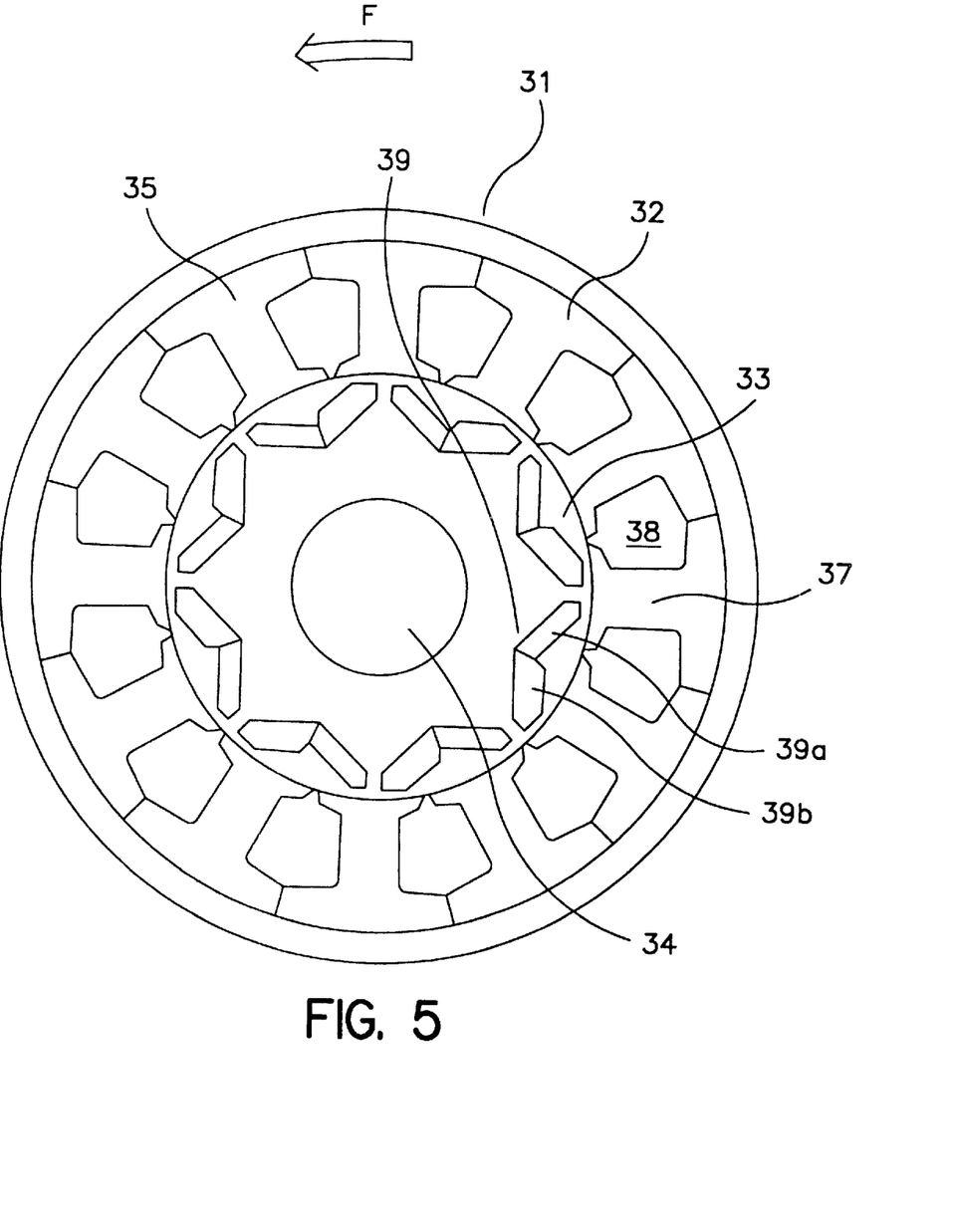
FIG. 5 is a sectional view of a motor in exemplary embodiment 2 of the invention.

Embodiment 2 is described by referring to FIG. 5.

In FIG. 5, is a synchronous motor 31 rotating mainly in a principal rotating direction F, by using reluctance torque in addition to magnet torque, and it is composed of a stator 32, a rotor 33, and a rotary shaft 34.

The stator 32 is composed of a ring-shaped frame, a stator core combining plural independent core elements 35 made of high permeability material in an annular form, and a winding wound around slots 38 formed between teeth 37 of each core element 35, and when a current is applied to these winding groups, it is composed to generate a rotary magnetic field.

Permanent magnets 39 are buried inside the rotor 3 disposed in this stator 32. The shape of permanent magnets 39 is in V-form, and the permanent magnets project to the center of the rotor 33. By thus reverse projecting magnetic poles, the inductance difference of the d-axis and q-axis can be increased. The permanent magnet 39 is composed of a permanent magnet forward portion 39a and a permanent magnet backward portion 39b in the rotor normal rotating direction F. At this time, the thickness of the permanent magnet backward portion 39b is greater than the thickness of the permanent magnet forward portion 39a.

Such constitution is based on the following reason. In the permanent magnet backward portion 39b, the magnetic flux produced from the permanent magnet backward portion 39b and the magnetic flux produced from the teeth 39 may repel each other, possibly causing demagnetization of the permanent magnet backward portion 39b. In order to use a magnet capable of generating a magnetic force not to cause demagnetization, a thick permanent magnet was used.

However, in the motor which rotates almost in the normal rotating direction F only, the permanent magnet forward portion 39a which is sucked by the suction force from the teeth does not cause demagnetization, and it is not required to be as thick as the permanent magnet backward portion 39b. Hence, the permanent magnet forward portion 39a may be thinner than the permanent magnet backward portion 39b. As a result, in the motor rotating almost always in the normal direction, if the quantity of permanent magnets is decreased, the characteristic is not lowered, so that the quantity of the permanent magnets can be decreased.

The teeth confronting surface of the incorporated permanent magnet backward portion 39b projects to the stator 35 side and is thicker than the permanent magnet forward portion 39a. However, the teeth confronting surface of the incorporated permanent magnet backward portion 39b may be symmetrical to the confronting surface of the permanent magnet forward portion 39a, and may project to the rotor center side.

In the buried magnets, a weight for adjusting the balance between the forward portion and backward portion during rotary drive may be buried in the rotor.

The shape of the permanent magnets is not limited to V-form, but may be linear or arcuate.

(Embodiment 3)

Figure 6:
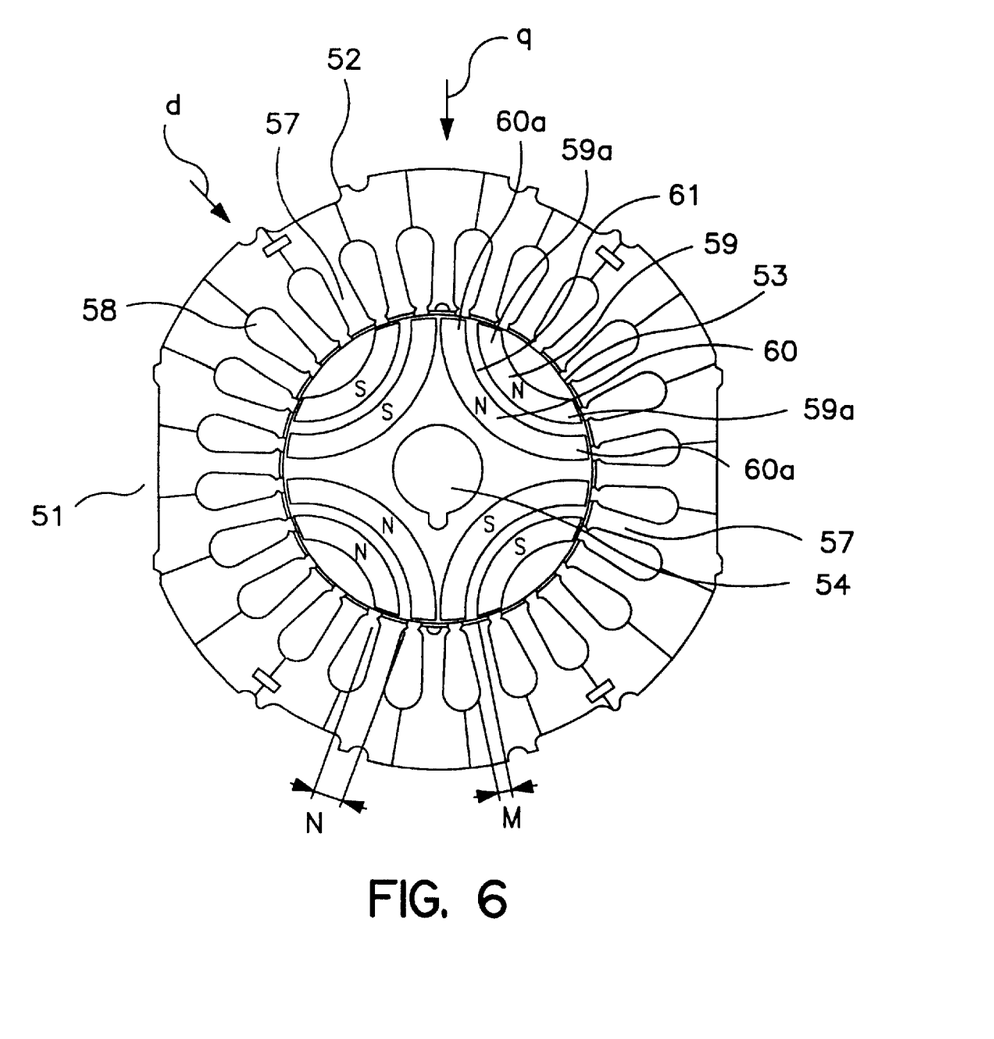
FIG. 6 is a sectional view of a motor in exemplary embodiment 3 of the invention.

A third embodiment is explained by referring to FIG. 6.

In FIG. 6, is a synchronous motor 51 rotates by making use of reluctance torque in addition to magnet torque, and it is composed of a stator 52, a rotor 53, and a rotary shaft 54.

The stator 52 is composed by combining plural independent core elements 55 made of high permeability material in an annular form. A winding is turned around slots 58 formed between teeth 57 of each core element 55, and it is designed to generate a rotary magnetic field by applying a current in the winding group.

In the rotor 53, four sets of permanent magnets 59, 60 arranged to have N-pole and S-pole alternately are buried in the rotor core made of high permeability material, and fixed on a rotor shaft 54. The permanent magnet per pole is divided into two sections in the rotor radial direction, and is composed of an outside permanent magnet 59 and an inside permanent magnet 60. The permanent magnets 59, 60 are formed in a convex arc shape at the rotor center side, and the both ends 59a, 60a are extended to the position close to the rotor outer circumference. The gap between the outside permanent magnet 59 and inside permanent magnet 60 is almost a constant width, and a passage 61 of magnetic flux in the q-axis direction is formed in this gap portion.

The stator 52 has a specific number of teeth 57, and a winding (not shown) is turned around each tooth 57. At this time, since the winding is applied on each core element 55, a single winding is applied. As an alternating current is given to the stator winding, a rotary magnetic flux is generated, and by this rotary magnetic flux, magnet torque and reluctance torque act on the rotor 53, so that the rotor 53 is driven by rotation.

The width M of the gap between the outside permanent magnet 59 and inside permanent magnet 60 is desired to be as small as possible considering the loss of electromagnetic force of the permanent magnets 59, 60. However, from the viewpoint of q-axis inductance Lq, it is desired to be as large as possible to increase it to such an extent not to cause magnetic saturation.

Accordingly, in embodiment 3, as the width not to induce magnetic flux saturation generated by the current flowing in the winding, the width M is set at about half of the width N of the teeth 56. Investigating the width M and the q-axis inductance Lq, it is known that the q-axis inductance Lq decreases suddenly when the width M becomes smaller than one-third of the width N of the teeth 57. On the other hand, if the width M becomes larger than the width N of the teeth 57, the q-axis inductance Lq hardly changes. According to the result of the investigation, it is known that the gap between the outside permanent magnet 59 and inside permanent magnet 60, that is, the width M should be set larger than ⅓ of the width N of the stator 57.

In embodiment 3, the magnetic flux path is formed of plural layers of permanent magnets, and although the number of plural layers is not limited, it is known from the experiment that the efficiency is the highest in two layers.

(Embodiment 4)

Figure 7:
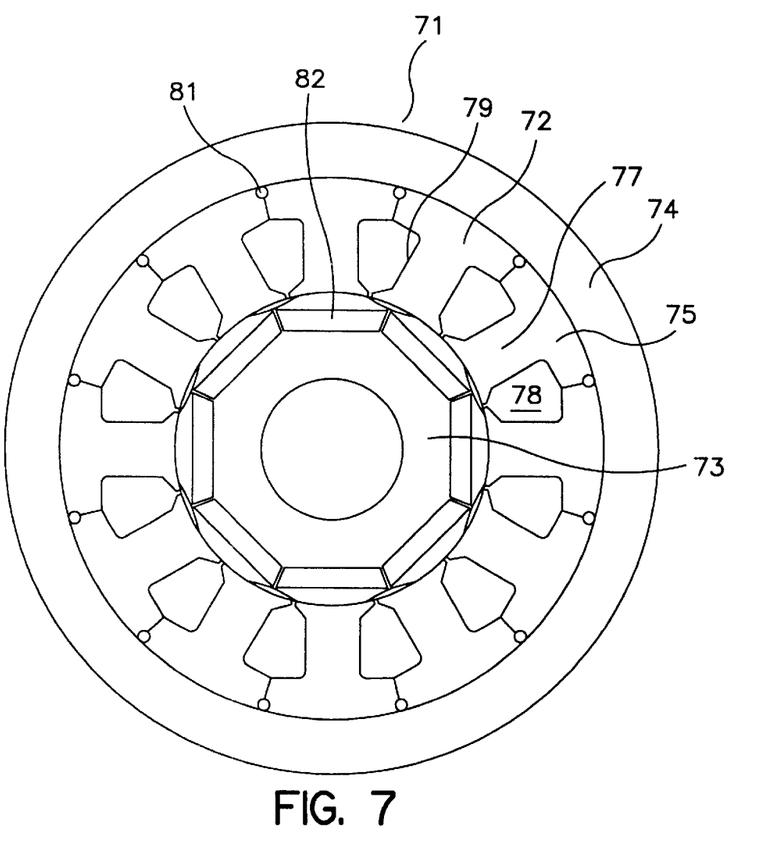
FIG. 7 is a sectional view of a motor in exemplary embodiment 4 of the invention.
Figure 8:
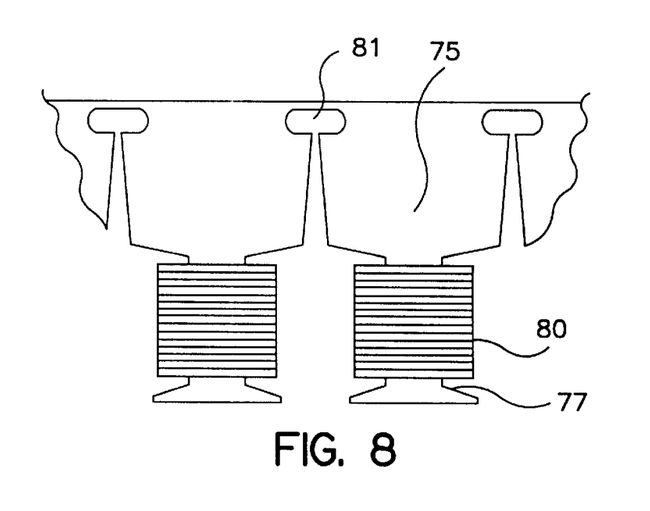
FIG. 8 is a sectional view of a motor in exemplary embodiment 5 of the invention.

Referring now to FIG. 7 and FIG. 8, embodiment 4 is described below. In FIG. 7, is a synchronous motor 71 rotates by utilizing reluctance torque in addition to magnet torque, and it is composed of a stator 72 and a rotor 73.

The stator 72 is composed of a ring-shaped frame 74, a stator core combining plural independent core elements 75 made of high permeability material in an annular form, and a winding 80 turned around slots 78 formed between teeth 77 of each core element 75, and it is designed to generate a rotary magnetic field by applying a current in the winding group.

The core elements 75 connect the end portions of core elements 75 as shown in FIG. 8, and compose a core element group. The core element group has a space in a folding portion 81 at the end, so as to be folded easily. By composing the stator 72 by turning and folding the winding 80 in the core element group, the stator can be assembled and positioned easily. At this time, the core elements 75 may be connected by welding, or fixed by fitting the ring-shaped frame 74.

An annular stator may be composed of one core element group, or plural core element groups may be combined to compose the annular stator.

Instead of forming the stator, alternatively, by contact of the end faces of the core elements 75, the stator may be formed by fixing the core element group by using resin or the like.

(Embodiment 5)

Figure 9:
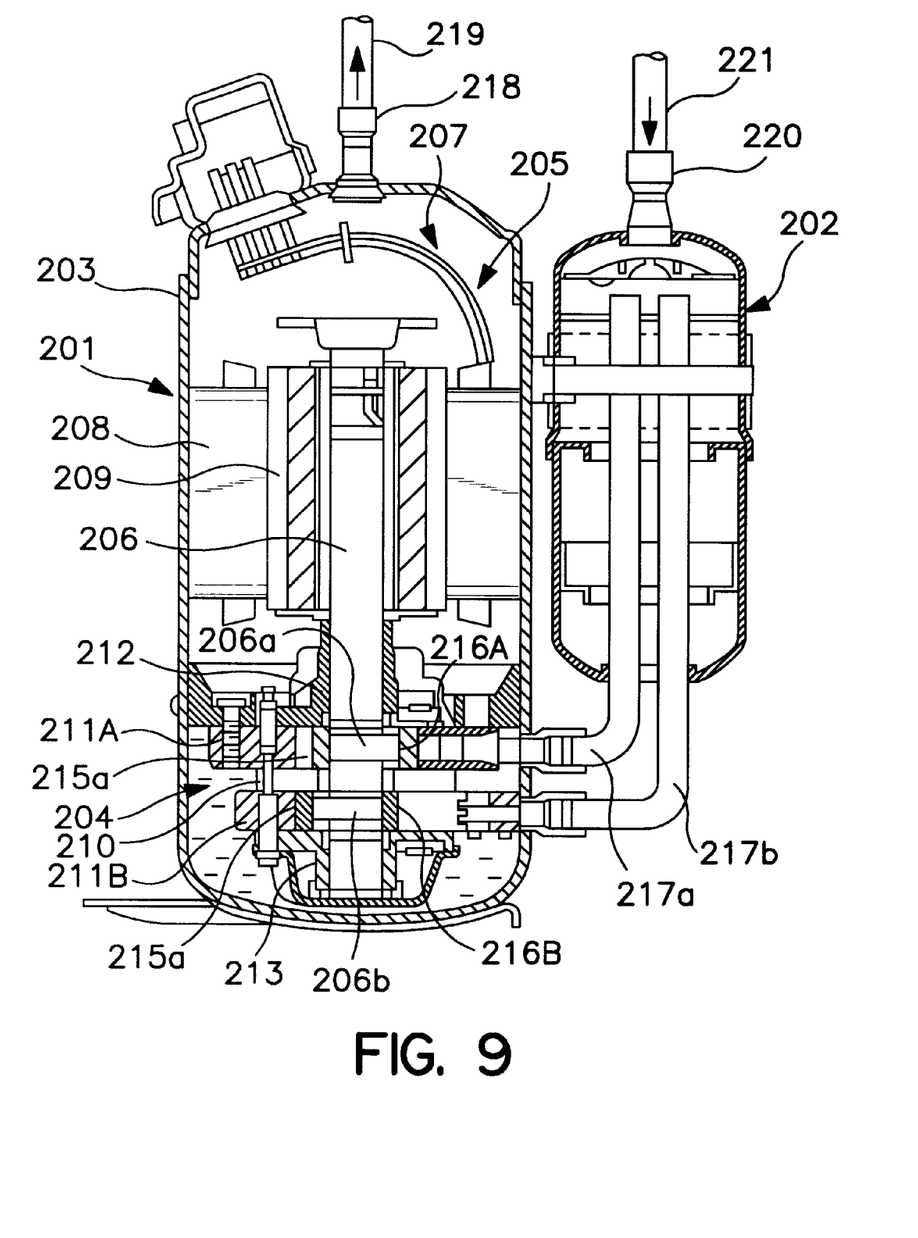
FIG. 9 shows the structure of a compressor having a motor in accordance with an exemplary embodiment of the present invention.

FIG. 9 shows a structure of a compressor having a motor of the embodiment of the invention. A compressor comprises a compression mechanism and a motor. The compression mechanism has a function for compressing and discharging a refrigerant. The compressor 1 has an enclosed structure. The compressor 201 is connected to an accumulator 202.

The enclosed compressor 201 has an enclosed case 203. A compression mechanism 204 is provided in the lower part of the enclosed case 203, and the upper part includes a stator core 8 having a plurality of teeth, a winding having a single winding applied on the teeth, and a rotor 209 incorporating a plurality of permanent magnets, and the pitch of the permanent magnets is larger than the stator coil pitch of a motor 205. The compression mechanism 204 and motor 205 are coupled together through a rotary shaft 206, and a motor-driven compressor main body 207 is composed.

The inside of the enclosed case 203 is filled with refrigerating machine oil, and the majority of the compression mechanism 204 is immersed.

The compression mechanism 204 has two cylinders 211A, 211B disposed above and below a partition board 210 in the lower part of the rotary shaft 206. The upper cylindrical 211A has its upper surface fitted and fixed to a main bearing 212. A subsidiary bearing 213 is fitted and fixed to the lower surface of the lower cylindrical 211B.

The upper and lower surfaces of the cylinders 211A, 211B are divided by the partition board 210, main bearing 212, and subsidiary bearing 213, and cylinder chambers 215a, 215b are formed in the inside. The individual cylinder chambers 215a, 215b comprise so-called rotary compression mechanism 216A, 215B for eccentrically rotating and driving the rollers along with rotation of the rotary shaft, and partitioning the cylinder chamber into high pressure side and low pressure side by a vane. This compression mechanism 204 is of two-cylinder type, but it may be also of a one-cylinder type.

The cylinder chambers 215a, 215b of the both cylinders 211A, 211B communicate with the accumulator 202 through guide pipes 217a, 217b. A discharge pipe 218 is connected to the upper surface of the enclosed case 203. An external piping of refrigerant pipe 219 is connected to the discharge pipe 218, and communicates with a condenser (not shown) for composing the refrigeration cycle.

A suction pipe 220 is connected to the upper surface of the accumulator 202. A refrigerant pipe 221 is connected to the suction pipe 220, and it communicates with an evaporator (not shown) for composing the refrigeration cycle.

An expansion mechanism is connected between the condenser and evaporator, and a refrigeration cycle is composed to communicate sequentially with the accumulator 202 through the compressor 201, condenser, expansion mechanism, and evaporator.

This embodiment relates to the rotary compressor, and it may be also realized by the scroll type or reciprocating type compression mechanism as far as the motor comprises a rotor having permanent magnets built in a single-wound stator. Not limited to vertical type compressor, a horizontal type compressor may be also used.

(Embodiment 6)

Figure 10:
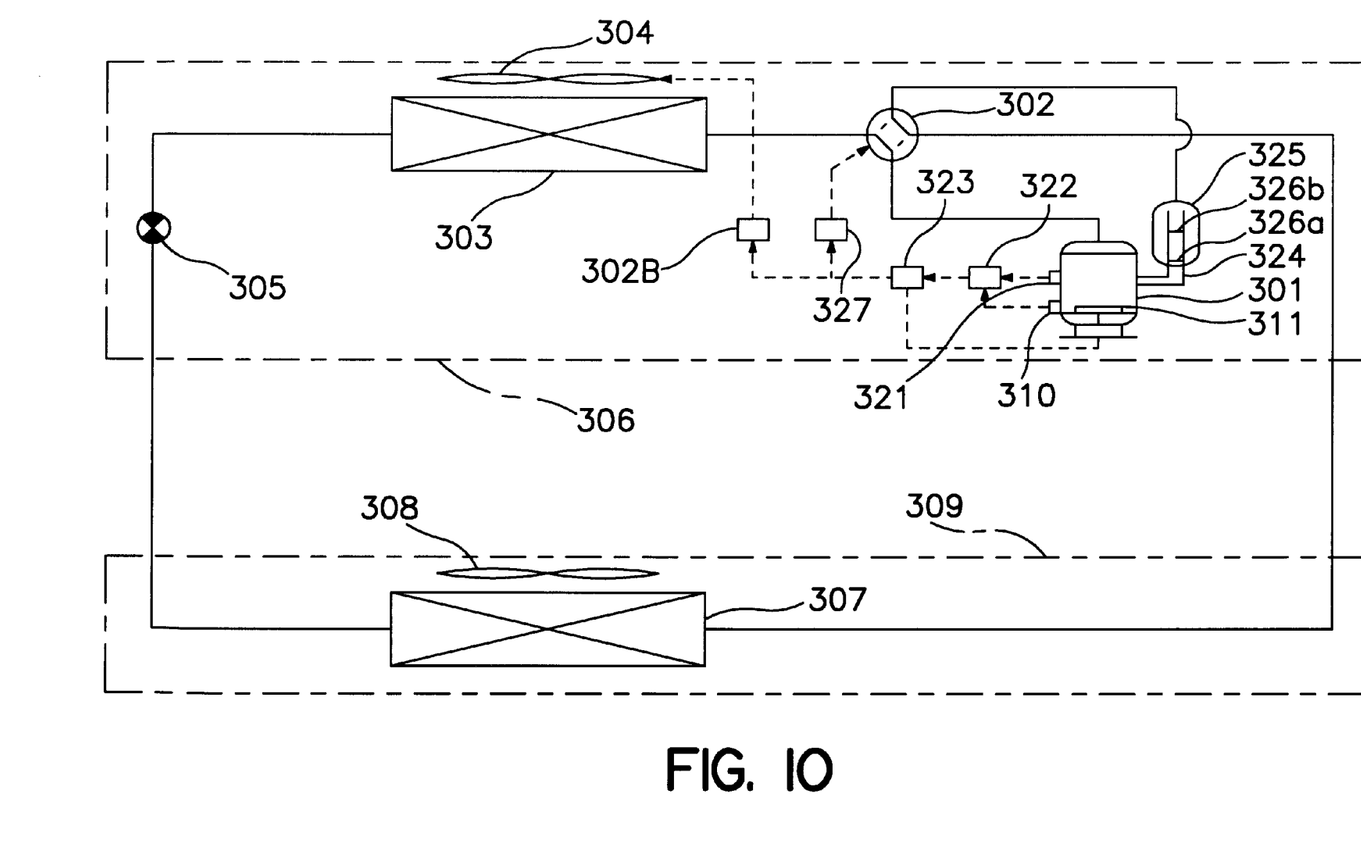
FIG. 10 shows the structure of an air conditioner using a compressor having a motor in accordance with an exemplary embodiment of the present invention.

FIG. 10 shows a general structure of an air conditioner using a compressor having a motor of the embodiment. A compressor 301 comprises a stator core having a plurality of teeth, a winding having a single winding applied on the teeth, and a rotor incorporating a plurality of permanent magnets. The pitch of the permanent magnets is larger than the stator coil pitch of a motor 305. An outdoor unit 6 comprises a four-way valve 302 for changing over cooling operation and heating operating, an outdoor heat exchanger 303, an outdoor fan 304, and an expansion valve 305.

An indoor unit has an indoor heat exchanger 307 and an indoor fan 308. The compressor 301, four-way valve 302, and outdoor unit heat exchanger 307 are connected by piping, and the inside is filled with a single refrigerant, HCFC22. The inside of the compressor 301 is filled with oil for lubricating and cooling the compressor mechanism and cooling the motor in the compressor.

When cooling by the indoor unit 309, changing over the four-way valve 302, the outdoor heat exchanger 303 is used as a condenser, and the indoor heat exchanger 307 as the evaporator. When heating by the indoor unit 309, changing over the four-way valve 302. The outdoor heat exchanger 303 is used as the evaporator, and the indoor heat exchanger 307 as the condenser.

The embodiment relates to the separate type air conditioner divided into the outdoor unit and indoor unit, but it is also realized by the window type containing the outdoor unit and indoor unit in one body.

In the refrigerant, HCFC22 is used, but chlorine-free refrigerant (HFC), carbon dioxide, HC and others may be also used.

(Embodiment 7)

Figure 11:
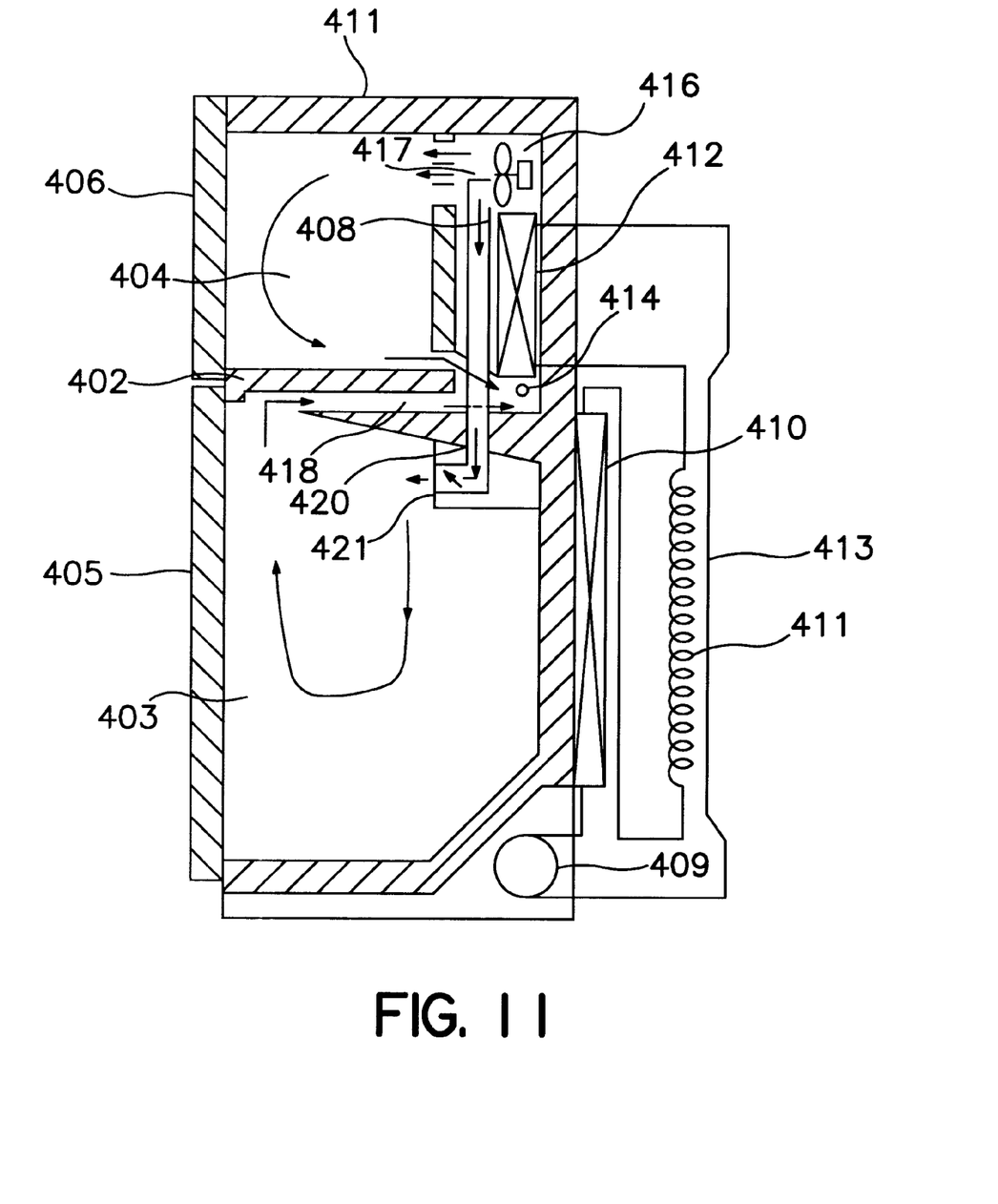
FIG. 11 shows the structure of an air conditioner using a compressor having a motor accordance with an exemplary embodiment of the present invention.

FIG. 11 shows a structure of a refrigerator using a compressor having a motor of the embodiment of the invention. The refrigerator main body 401 has its inside divided into a refrigerating compartment 403 and a freezing compartment 404 by a partition wall 402. In the refrigerating compartment 403 and freezing compartment 404, a refrigerating compartment wall 405 and a freezing compartment wall 406 are individually provided. A machine compartment 407 is disposed in the lower back part of the main body 401. At the back side of the freezing compartment 404, a cooling compartment 408 separated from the freezing compartment 404 is disposed. A compressor 409 is installed in the machine compartment 407, and a condenser 410, a capillary tube 411, and evaporator 412 installed in the cooling chamber 408, and a suction pipe 413 are sequentially connected in a loop, thereby composing a cooling system.

The capillary tube 411 and suction pipe 413 are installed closely to each other by soldering or the like so as to exchange heat with each other. Near the evaporator 412, a defrosting heater 414 is installed, and defrosting detecting means 415 for detecting start and end of defrosting is also disposed. In order to circulate the air cooled in the evaporator 412 into the refrigerating compartment 403 and freezing compartment 404, the structure further comprises a compartment fan 416, and a blow-out channel 417 and a suck-in channel 418 for communicating the refrigerating compartment 403, freezing compartment 404 and cooling compartment 408.

The refrigerant at high temperature and high pressure discharged from the compressor 404 is exchanged in heat with fresh air in the condenser 410, and is condensed and liquefied, and flows into the capillary tube 411. In the capillary tube 411, the refrigerant is reduced in pressure, and is evaporated in the evaporator 412, and exchanged in heat with the air in the refrigerating compartment 403 and freezing compartment 404 by means of the compartment fan 416. The evaporated and vaporized refrigerant directly passes through the suction pipe 413, and returns to the compressor 409. At this time, since the capillary tube 411 and suction pipe 413 are disposed so as to exchange heat with each other, the vaporized gas refrigerant at low temperature in the suction pipe and the liquefied liquid refrigerant at high temperature in the capillary tube 411 exchange heat with each other, and the liquid refrigerant decreases in the enthalpy in the overcooling direction, while the gas refrigerant increases in the overheating direction. As a result, the refrigerating effect is increased, and the refrigerating capacity of the cooling system is enhanced.

As described herein, in the invention as set forth herein, by a single winding, the winding does not project excessively to the stator end surface, and hence the coil end may be reduced in size.

Further, in the invention as set forth in herein, since the winding can be applied on a single core element or by expanding the interval of the adjacent teeth, turning is easy and an arrangement winding can be applied. It is not necessary to provide a space between slots necessary for turning the winding by the turning device. Hence, the occupation rate can be enhanced, and the reluctance torque acts efficiently, so that a motor of large output and small size can be presented. In the interval of ends of adjacent teeth, it is not necessary to consider turning of the winding, the interval of ends of adjacent teeth can be decreased, and it is effective to suppress cogging torque.

Further, in the motor as set forth herein, the reluctance torque can be utilized efficiently.

Further, in the motor as set forth herein, the torque ripple can be decreased.

Further, in the motor as set forth herein, the cogging torque can be reduced.

Further, in the motor as set forth herein, the cogging torque can be eliminated.

Further, in the motor as set forth herein, generation of useless magnetic flux at the adjacent teeth side can be suppressed.

Further, in the motor as set forth herein, the quantity of permanent magnets can be decreased.

Further, in the motor as set forth herein, the balance is not broken, and stable rotary drive is realized.

Further, in the motor as set forth herein, the magnetic resistance is increased in the adjoining portions of the permanent magnets so that the magnetic flux distribution may be close to a sine waveform, and thereby the cogging torque can be suppressed.

Further, in the motor as set forth herein, a magnetic path is formed between permanent magnets, and the directivity of the magnetic flux flowing in the rotor is excellent.

Further, in the motor as set forth herein, the motor can be rotated and driven efficiently.

Further, in the motor as set forth herein, the motor can be rotated and driven more efficiently.

Further, in the motor as set forth herein, the occupation rate can be raised, and a large output and a small size are realized.

Further, in the motor as set forth herein, heat generation caused by large current can be suppressed, and the efficiency is improved.

Further, in the motor as set forth in claims 31, 32, 33, 34, a smaller size and a wider accommodation are realized.

Although illustrated and described herein with reference to exemplary embodiments, the present invention is nevertheless not intended to be limited to hereto. Rather, various modifications at the exemplary embodiments may be made within the scope and range of equivalents of the claims and without departing from the spirit of the invention.

What is claimed is:

1. A compressor comprising:
   a compressor mechanism, said compressor mechanism compressing and discharging a refrigerant, and
   a motor driving said compression mechanism, a stator core with a plurality of 3n teeth, where n is a natural number, and a concentrated winding applied over each one of said plurality of teeth, a rotor rotatably mounted in the stator core, said rotor incorporating a plurality of 2n permanent magnets, said stator core arranged in an annular form by combining a plurality of core elements, each of said permanent magnets provided at a larger pitch relative to the stator winding pitch.

2. The compressor of claim 1, wherein said rotor further includes iron material, said iron material being disposed between each of said permanent magnets.

3. The compressor of claim 1 wherein each one of said plurality of teeth includes an outer circumference, and is formed by the arrangement of adjacent core elements.

4. The compressor of claim 1, further comprising a heat exchanger, wherein a refrigerating cycle is enabled by the connection of said compressor and said heat exchanger for forming an air-conditioning device.

5. The compressor of claim 1, further comprising a heat exchanger, wherein a refrigerating cycle is enabled by the connection of said compressor and said heat exchanger for forming refrigeration device.

6. The compressor of claim 1, wherein said plurality of permanent magnets are formed in groups of plural layers, with the ends of at least two layers being adjacent to an outer circumference of the stator core.

7. The compressor of claim 1, wherein an interval "d" between the ends of each one of the plurality of teeth is smaller than the width of the winding.

8. The compressor of claim 1, wherein end portions of adjacent magnets face each other.

9. The compressor of claim 1 wherein said refrigerant includes HFC (Hydro-Fluoro-Carbon).

10. The compressor of claim 1 wherein said refrigerant includes a carbon dioxide.

11. The compressor of claim 1 wherein said refrigerant includes HC (Hydro-Carbon).

12. A compressor comprising: a compression mechanism, for compressing and discharging a refrigerant, a motor driving said compression mechanism said motor includes a stator core having a plurality of 3n teeth where n is a natural number, a concentrated winding applied over each one of said plurality of teeth and, a rotor rotatably mounted in the stator core, said rotor incorporating a plurality of 2n permanent magnets, each of said plurality of permanent magnets is provided at a larger pitch than the stator coil pitch, said plurality of permanent magnets are arranged around a rotor center, at least one of said plurality of permanent magnets has a first end and a second end each having respective surfaces facing said stator core and angled toward each other.

13. A compressor comprising:

a compression mechanism, for compressing and discharging a refrigerant, a motor driving said compression mechanism, said motor includes a stator core having a plurality of 3n teeth where n is a natural number, a concentrated winding applied over each one of said plurality of teeth; and a rotor rotatably mounted in the stator core, said rotor incorporating a plurality of 2n permanent magnets, each of said plurality of permanent magnets is provided at a larger pitch than the stator coil pitch, said plurality of permanent magnets are arranged around a center thereof, and at least one of said plurality of permanent magnets has a side facing said stator core which is angled inward towards the center.

14. A compressor comprising:

a compression mechanism, for compressing and discharging a refrigerant, and a motor driving said compression mechanism, said motor includes a stator core having a plurality of 3n teeth parts where n is a natural number, a concentrated winding applied over each one of said plurality of teeth parts; and a rotor rotatably mounted in said stator core, said rotor incorporating a plurality of 2n permanent magnets, each of said plurality of permanent magnets is provided at a larger pitch than the stator coil pitch a first outer periphery portion of said rotor is different in shape than a second outer periphery portion of said rotor and said second outer periphery portion is positioned in the stator core.

15. A compressor comprising:

a compressor mechanism for compressing and discharging a refrigerant, and a motor driving said compressor mechanism said motor including a stator core having a plurality of 3n core elements defining teeth where n is a natural number, a concentrated winding applied to each of the teeth of said plurality of core elements; and a rotor rotatably mounted in the stator core, said rotor including a plurality of 2n permanent magnets;

wherein said motor has 8 magnetic poles and 12 slots, and each of said plurality of permanent magnets is provided at a larger pitch than the stator coil pitch.

* * * * *